(12) United States Patent
Poznanovic et al.

(10) Patent No.: US 7,149,867 B2
(45) Date of Patent: Dec. 12, 2006

(54) SYSTEM AND METHOD OF ENHANCING EFFICIENCY AND UTILIZATION OF MEMORY BANDWIDTH IN RECONFIGURABLE HARDWARE

(75) Inventors: Daniel Poznanovic, Colorado Springs, CO (US); David E. Caliga, Colorado Springs, CO (US); Jeffrey Hammes, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 0 days.

(21) Appl. No.: 10/869,200

(22) Filed: Jun. 16, 2004

(65) Prior Publication Data

US 2004/0260884 A1    Dec. 23, 2004

Related U.S. Application Data

(60) Provisional application No. 60/479,339, filed on Jun. 18, 2003.

(51) Int. Cl.
*G06F 12/00* (2006.01)
(52) U.S. Cl. .................................... 711/170; 711/154
(58) Field of Classification Search ........ 711/170–173; 712/15
See application file for complete search history.

(56) References Cited

U.S. PATENT DOCUMENTS

| | | | |
|---|---|---|---|
| 6,076,152 A | 6/2000 | Huppenthal et al. | |
| 6,243,791 B1 * | 6/2001 | Vondran, Jr. ................. | 711/120 |
| 6,247,110 B1 | 6/2001 | Huppenthal et al. | |
| 6,460,122 B1 * | 10/2002 | Otterness et al. ........... | 711/154 |
| 6,507,898 B1 * | 1/2003 | Gibson et al. .............. | 711/168 |
| 6,594,736 B1 | 6/2003 | Parks | |
| 6,714,041 B1 * | 3/2004 | Darling et al. ................. | 326/38 |
| 2003/0046492 A1 * | 3/2003 | Gschwind et al. .......... | 711/118 |
| 2003/0046530 A1 * | 3/2003 | Poznanovic .................. | 713/100 |
| 2003/0084244 A1 * | 5/2003 | Paulraj ........................ | 711/118 |
| 2003/0088737 A1 * | 5/2003 | Burton ........................ | 711/118 |
| 2003/0208658 A1 * | 11/2003 | Magoshi ..................... | 711/122 |
| 2005/0044327 A1 * | 2/2005 | Howard et al. ............. | 711/147 |

OTHER PUBLICATIONS

"Summary: The Cache Read/Write Process," The PC Guide, 2001, www.pcguide.com/ref/mbsys/cache/func.htm.*
Chien et al., "Safe and Protected Execution for the Morph/AMRM Reconfigurable Processor," IEEE, 1999, pp. 1-13.*
IEEE 100: The Authoritative Dictionary of IEEE Standards Terms, Standards Information Network, 2000, pp. 874.*

* cited by examiner

*Primary Examiner*—Gary Portka
*Assistant Examiner*—Shane M. Thomas
(74) *Attorney, Agent, or Firm*—William J. Kubida; Michael C. Martensen; Hogan & Hartson LLP

(57) ABSTRACT

A reconfigurable processor that includes a computational unit and a data prefetch unit coupled to the computational unit, where the data prefetch unit retrieves data from a memory and supplies the data to the computational unit through memory and a data access unit, and where the data prefetch unit, memory, and data access unit is configured by a program. Also, a reconfigurable hardware system that includes a common memory; and one or more reconfigurable processors coupled to the common memory, where at least one of the reconfigurable processors includes a data prefetch unit to read and write data between the unit and the common memory, and where the data prefetch unit is configured by a program executed on the system. In addition, a method of transferring data that includes transferring data between a memory and a data prefetch unit in a reconfigurable processor; and transferring the data between a computational unit and the data prefetch unit.

19 Claims, 12 Drawing Sheets

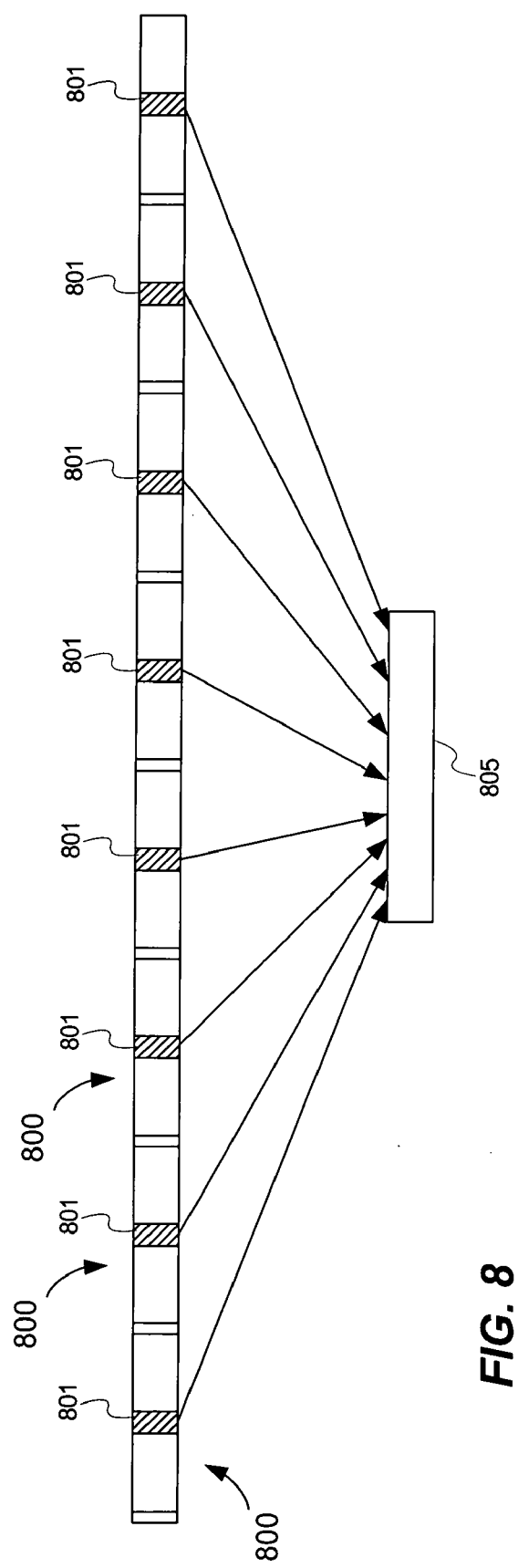

SYSTEM AND METHOD OF ENHANCING EFFICIENCY AND UTILIZATION OF MEMORY BANDWIDTH IN RECONFIGURABLE HARDWARE

RELATED APPLICATIONS

The present invention claims the benefit of U.S. Provisional Patent application Ser. No. 60/479,339 filed on Jun. 18, 2003, which is incorporated herein by reference in its entirety.

BACKGROUND OF THE INVENTION

1. Field of the Invention

The present invention relates, in general, to enhancing the efficiency and utilization of memory bandwidth in reconfigurable hardware. More specifically, the invention relates to implementing explicit memory hierarchies in reconfigurable processors that make efficient use of off-board, on-board, on-chip storage and available algorithm locality. These explicit memory hierarchies avoid many of the tradeoffs and complexities found in the traditional memory hierarchies of microprocessors.

2. Relevant Background

Over the past 30 years, microprocessors have enjoyed annual performance gains averaging about 50% per year. Most of the gains can be attributed to higher processor clock speeds, more memory bandwidth and increasing utilization of instruction level parallelism (ILP) at execution time.

As microprocessors and other dense logic devices (DLDs) consume data at ever-increasing rates it becomes more of a challenge to design memory hierarchies that can keep up. Two measures of the gap between the microprocessor and memory hierarchy are bandwidth efficiency and bandwidth utilization. Bandwidth efficiency refers to the ability to exploit available locality in a program or algorithm. In the ideal situation, when there is maximum bandwidth efficiency, all available locality is utilized. Bandwidth utilization refers to the amount of memory bandwidth that is utilized during a calculation. Maximum bandwidth utilization occurs when all available memory bandwidth is utilized.

Potential performance gains from using a faster microprocessor can be reduced or even negated by a corresponding drop in bandwidth efficiency and bandwidth utilization. Thus, there has been significant effort spent on the development of memory hierarchies that can maintain high bandwidth efficiency and utilization with faster microprocessors.

One approach to improving bandwidth efficiency and utilization in memory hierarchies has been to develop ever more powerful processor caches. These caches are high-speed memories (typically SRAM) in close proximity to the microprocessor that try to keep copies of instructions and data the microprocessor may soon need. The microprocessor can store and retrieve data from the cache at a much higher rate than from a slower, more distant main memory.

In designing cache memories, there are a number of considerations to take into account. One consideration is the width of the cache line. Caches are arranged in lines to help hide memory latency and exploit spatial locality. When a load suffers a cache miss, a new cache line is loaded from main memory into the cache. The assumption is that a program being executed by the microprocessor has a high degree of spatial locality, making it likely that other memory locations in the cache line will also be required.

For programs with a high degree of spatial locality (e.g., stride-one access), wide cache lines are more efficient since they reduce the number of times a processor has to suffer the latency of a memory access. However, for programs with lower levels of spatial locality, or random access, narrow lines are best as they reduce the wasted bandwidth from the unused neighbors in the cache line. Caches designed with wide cache lines perform well with programs that have a high degree of spatial locality, but generally have poor gather/scatter performance. Likewise, caches with short cache lines have good gather/scatter performance, but loose efficiency executing programs with high spatial locality because of the additional runs to the main memory.

Another consideration in cache design is cache associativity, which refers to the mapping between locations in main memory and cache sectors. At one extreme of cache associativity is a direct-mapped cache, while at another extreme is a fully associative cache. In a direct mapped-cache, a specific memory location can be mapped to only a single cache line. Direct-mapped caches have the advantage of being fast and easy to construct in logic. The disadvantage is that they suffer the maximum number of cache conflicts. At the other extreme, a fully associative cache allows a specific location in memory to be mapped to any cache line. Fully associative caches tend to be slower and more complex due to the large amount of comparison logic they need, but suffer no cache conflict misses. Oftentimes, caches fall between the extremes of direct-mapped and fully associative caches. A design point between the extremes is a k-set associative cache, where each memory location can map to k cache sectors. These caches generally have less overhead than fully associative caches, and reduce cache conflicts by increasing the value of k.

Another consideration in cache design is how cache lines are replaced due to a capacity or conflict miss. In a direct-mapped cache, there is only one possible cache line that can be replaced due to a miss. However, in caches with higher levels of associativity, cache lines can be replaced in more that one way. The way the cache lines are replaced is referred to as the replacement policy.

Options for the replacement policy include least recently used (LRU), random replacement, and first in-first out (FIFO). LRU is used in the majority of circumstances where the temporal locality set is smaller than the cache size, but it is normally more expensive to build in hardware than a random replacement cache. An LRU policy can also quickly degrade depending on the working set size. For example, consider an iterative application with a matrix size of N bytes running through a LRU cache of size M bytes. If N is less than M, then the policy has the desired behavior of 100% cache hits, however, if N is only slightly larger than M, the LRU policy results in 0% cache hits as lines are removed just as they are needed.

Another consideration is deciding on a write policy for the cache. Write-through caches send data through the cache hierarchy to main memory. This policy reduces cache coherency issues for multiple processor systems and is best suited for data that will not be re-read by the processor in the immediate future. In contrast, write-back caches place a copy of the data in the cache, but does not immediately update main memory. This type of caching works best when a data just written to the cache is quickly requested again by the processor.

In addition to write-through and write-back caches, another kind of write policy is implemented in a write-allocate cache where a cache line is allocated on a write that misses in cache. Write-allocate caches improve performance when the microprocessor exhibits a lot of write followed by read behavior. However, when writes are not subsequently read, a write-allocate cache has a number of disadvantages: When a cache line is allocated, it is necessary to read the remaining values from main memory to complete the cache line. This adds unnecessary memory read traffic during store operations. Also, when the data is not read again, potentially useful data in the cache is displaced by the unused data.

Another consideration is made between the size and the speed of the cache: small caches are typically much faster than larger caches, but store less data and fewer instructions. Less data means a greater chance the cache will not have data the microprocessor is requesting (i.e., a cache miss) which can slow everything down while the data is being retrieved from the main memory.

Newer cache designs reduce the frequency of cache misses by trying to predict in advance the data that the microprocessor will request. An example of this type of cache is one that supports speculative execution and branch prediction. Speculative execution allows instructions that likely will be executed to start early based on branch prediction. Results are stored in a cache called a reorder buffer and retired if the branch was correctly predicted. Of course, when mis-predictions occur instruction and data bandwidth are wasted.

There are additional considerations and tradeoffs in cache design, but it should be apparent from the considerations described hereinbefore that it is very difficult to design a single cache structure that is optimized for many different programs. This makes cache design particularly challenging for a multipurpose microprocessor that executes a wide variety of programs. Cache designers try to derive the program behavior of "average" program constructed from several actual programs that run on the microprocessor. The cache is optimized for the average program, but no actual program behaves exactly like the average program. As a result, the designed cache ends up being sub-optimal for nearly every program actually executed by the microprocessor. Thus, there is a need for memory hierarchies that have data storage and retrieval characteristics that are optimized for actual programs executed by a processor.

Designers trying to develop ever more efficient caches optimized for a variety of actual programs also face another problem: as caches add additional features, the overhead needed to implement the added features also grows. Caches today have so much overhead that microprocessor performance may be reaching a point of diminishing returns as the overhead starts to cut into performance. In the Intel Pentium III processor for example, more than half of the 10 million transistors are dedicated to instruction cache, branch prediction, out-of-order execution and superscalar logic. The situation has prompted predictions that as microprocessors grow to a billion transistors per chip, performance increases will drop to about 20% per year. Such a prediction, if borne out, could have a significant impact on technology growth and the computer business.

Thus, there is a growing need to develop improved memory hierarchies that limit the overhead of a memory hierarchy without also reducing bandwidth efficiency and utilization.

SUMMARY OF THE INVENTION

Accordingly, an embodiment of the invention includes a reconfigurable processor that includes a computational unit and a data access unit coupled to the computational unit, where the data access unit retrieves data from an on-processor memory and supplies the data to the computational unit, and where the computational unit and the data access unit are configured by a program.

The present invention also involves a reconfigurable processor that includes a first memory of a first type and a data prefetch unit coupled to the memory, where the data prefetch unit retrieves data from a second memory of a second type different from the first type, and the first and second memory types and the data prefetch unit are configured by a program.

Another embodiment of the invention includes a reconfigurable hardware system that includes a common memory, also referred to as external memory, and one or more reconfigurable processors coupled to the common memory, where at least one of the reconfigurable processors includes a data prefetch unit to read and write data between the unit and the common memory, and where the data prefetch unit is configured by a program executed on the system.

Another embodiment of the invention includes a method of transferring data that includes transferring data between a memory and a data prefetch unit in a reconfigurable processor, transferring data between the prefetch unit and a data access unit, and transferring the data between a computational unit and the data access unit, where the computational unit, data access unit and the data prefetch unit are configured by a program.

Additional embodiments of the invention are set forth in part in the description that follows, and in part will become apparent to those skilled in the art upon examination of the following specification, or may be learned by the practice of the invention. The advantages of the invention may be realized and attained by means of the instrumentalities, combinations, compositions, and methods particularly pointed out in the appended claims.

BRIEF DESCRIPTION OF THE DRAWINGS

FIG. 8 shows the bandwidth efficiency and utilization gains obtained when utilizing a data prefetch unit and an intelligent memory controller to perform strided memory references;

DETAILED DESCRIPTION

1. Definitions:

Direct execution logic (DEL)—is an assemblage of dynamically reconfigurable functional elements that enables a program to establish an optimized interconnection among selected functional units in order to implement a desired computational, data prefetch and/or data access functionality for maximizing the parallelism inherent in the particular code.

Reconfigurable Processor—is a computing device that contains reconfigurable components such as FPGAs and can, through reconfiguration, instantiate an algorithm as hardware.

Reconfigurable Logic—is composed of an interconnection of functional units, control, and storage that implements an algorithm and can be loaded into a Reconfigurable Processor.

Functional Unit—is a set of logic that performs a specific operation. The operation may for example be arithmetic, logical, control, or data movement. Functional units are used as building blocks of reconfigurable logic.

Macro—is another name for a functional unit.

Memory Hierarchy—is a collection of memories

Data prefetch Unit—is a functional unit that moves data between members of a memory hierarchy. The movement may be as simple as a copy, or as complex as an indirect indexed strided copy into a unit stride memory.

Data access Unit—is a functional unit that accesses a component of a memory hierarchy, and delivers data directly to computational logic.

Intelligent Memory Control Unit—is a control unit that has the ability to select data from its storage according to a variety of algorithms that can be selected by a data requester, such as a data prefetch unit.

Bandwidth Efficiency—is defined as the percentage of contributory data transferred between two points. Contributory data is data that actually participates in the recipients processing.

Bandwidth Utilization—is defined as the percentage of maximum bandwidth between two points that is actually used to pass contributory data.

2. Description

A reconfigurable processor (RP) 100 implements direct executable logic (DEL) to perform computation, as well a memory hierarchy for maintaining input data and computational results. DEL is an assemblage of dynamically reconfigurable functional elements that enables a program to establish an optimized interconnection among selected functional units in order to implement a desired computational, data prefetch and/or data access functionality for maximizing the parallelism inherent in the particular code. The term DEL may also be used to refer to the set of constructs such as code, data, configuration variables, and the like that can be loaded into RP 100 to cause RP 100 to implement a particular assemblage of functional elements.

Figure 1:
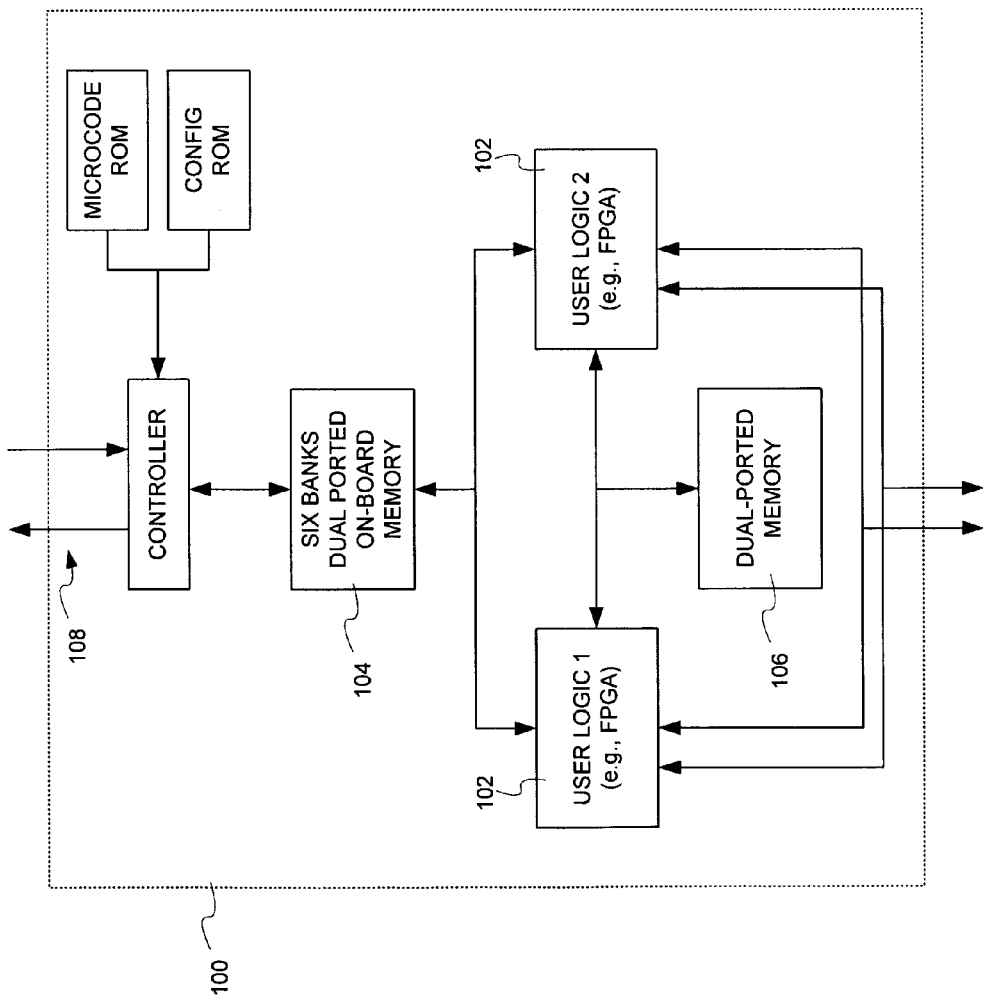
FIG. 1 shows a reconfigurable processor in which the present invention may be implemented.

FIG. 1 presents an RP 100, which may be implemented using field programmable gate arrays (FPGAs) or other reconfigurable logic devices, that can be configured and reconfigured to contain functional units and interconnecting circuits, and a memory hierarchy comprising on-board memory banks 104, on-chip block RAM 106, registers wires, and a connection 108 to external memory. On-chip reconfigurable components 102 create memory structures such as registers, FIFOs, wires and arrays using block RAM. Dual-ported memory 106 is shared between on-chip reconfigurable components 102. The reconfigurable processor 100 also implements user-defined computational logic (e.g., such as DEL 200 shown in FIG. 2) constructed by programming an FPGA to implement a particular interconnection of computational functional units. In a particular implementation, a number of RPs 100 are implemented within a memory subsystem of a conventional computer, such as on devices that are physically installed in dual inline memory module (DIMM) sockets of a computer. In this manner the RPs 100 can be accessed by memory operations and so coexist well with a more conventional hardware platform. It should be noted that, although the exemplary implementation of the present invention illustrated includes six banks of dual ported memory 104 and two reconfigurable components 102, any number of memory banks and/or reconfigurable components may be used depending upon the particular implementation or application.

Any computer program, including complex graphics processing programs, word processing programs, database programs and the like, is a collection of algorithms that interact to implement desired functionality. In the common case in which static computing hardware resources are used (e.g., a conventional microprocessor), the computer program is compiled into a set of executable code (i.e., object code) units that are linked together to implement the computer program on the particular hardware resources. The executable code is generated specifically for a particular hardware platform. In this manner, the computer program is adapted to conform to the limitations of the static hardware platform. However, the compilation process makes many compromises based on the limitations of the static hardware platform.

Alternatively, an algorithm can be defined in a high level language then compiled into DEL. DEL can be produced via a compiler from high level programming languages such as C or FORTRAN or may be designed using a hardware definition language such as Verilog, VHDL or a schematic capture tool. Computation is performed by reconfiguring a reconfigurable processor with the DEL and flowing data through the computation. In this manner, the hardware resources are essentially adapted to conform to the program rather than the program being adapted to conform to the hardware resources.

Figure 2:
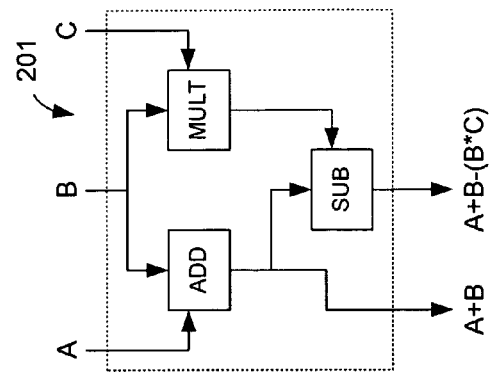
FIG. 2 shows computational logic as might be loaded into a reconfigurable processor.

For purposes of this description a single reconfigurable processor will be presented first. A sample of computational logic 201 is shown in FIG. 2. This simple assemblage of functional units performs computation of two results ("A+B" and "A+B−(B*C)) from three input variables or operands "A", "B" and "C". In practice, computational units 201 can be implemented to perform very simple or arbitrarily complex computations. The input variables (operands) and output or result variables may be of any size necessary for a particular application. Theoretically, any number of operands and result variables may be used/generated by a particular DEL. Great complexity of computation can be supported by adding additional reconfigurable chips and processors.

For greatest performance the DEL 200 is constructed as parallel pipelined logic blocks composed of computational functional units capable of taking data and producing results with each clock pulse. The highest possible performance that can be achieved is computation of a set of results with each clock pulse. To achieve this, data should be available at the same rate the computation can consume the data. The rate at which data can be supplied to DEL 200 is determined, at least in significant part, by the memory bandwidth utilization and efficiency. Maximal computational performance can be achieved with parallel and pipelined DEL together with maximizing the memory bandwidth utilization and efficiency. Unlike conventional static hardware platforms, however, the memory hierarchy provided in a RP 100 is reconfigurable. In accordance with the present invention, through the use of data access units and associated memory hierarchy components, computational demands and memory bandwidth can be matched.

Figure 3:
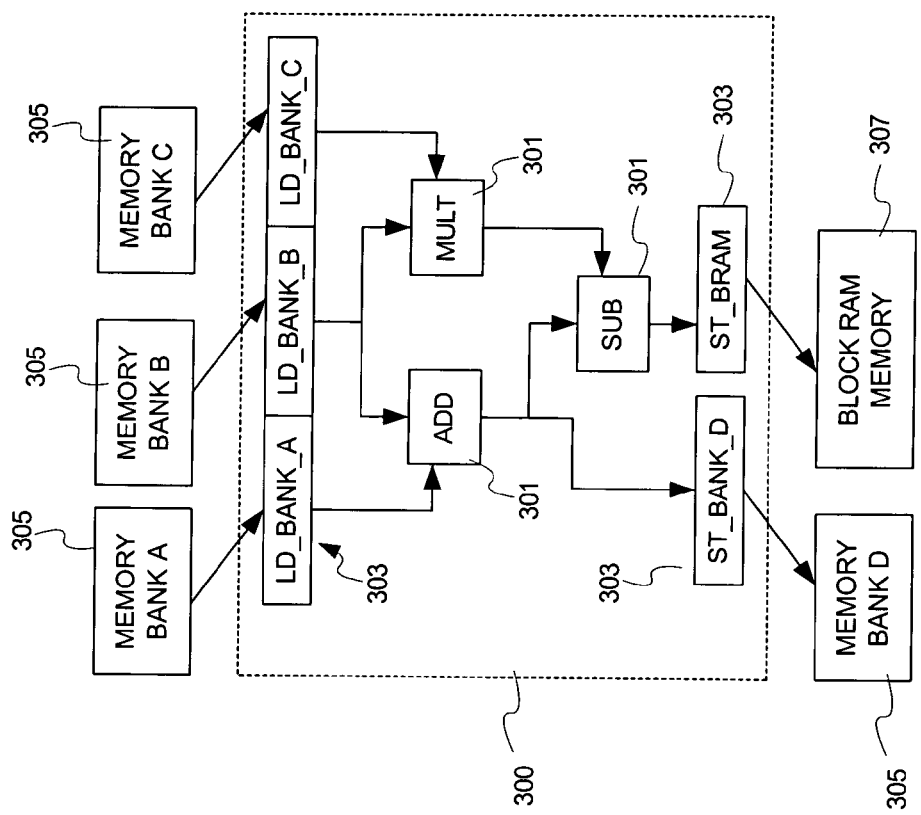
FIG. 3 shows a reconfigurable processor as in FIG. 1, but with the addition of data access units.

High memory bandwidth efficiency is achieved when only data required for computation is moved within the memory hierarchy. FIG. 3 shows a simple logic block 300 comprising computational functional units 301, control (not shown), and data access functional units 303. The data access unit 303 presents data directly to the computational logic 301. In this manner, data is moved from a memory device 305 to the computational logic and from the computational logic back into a memory device 305 or block RAM memory 307 within an RP 100.

Figure 4:
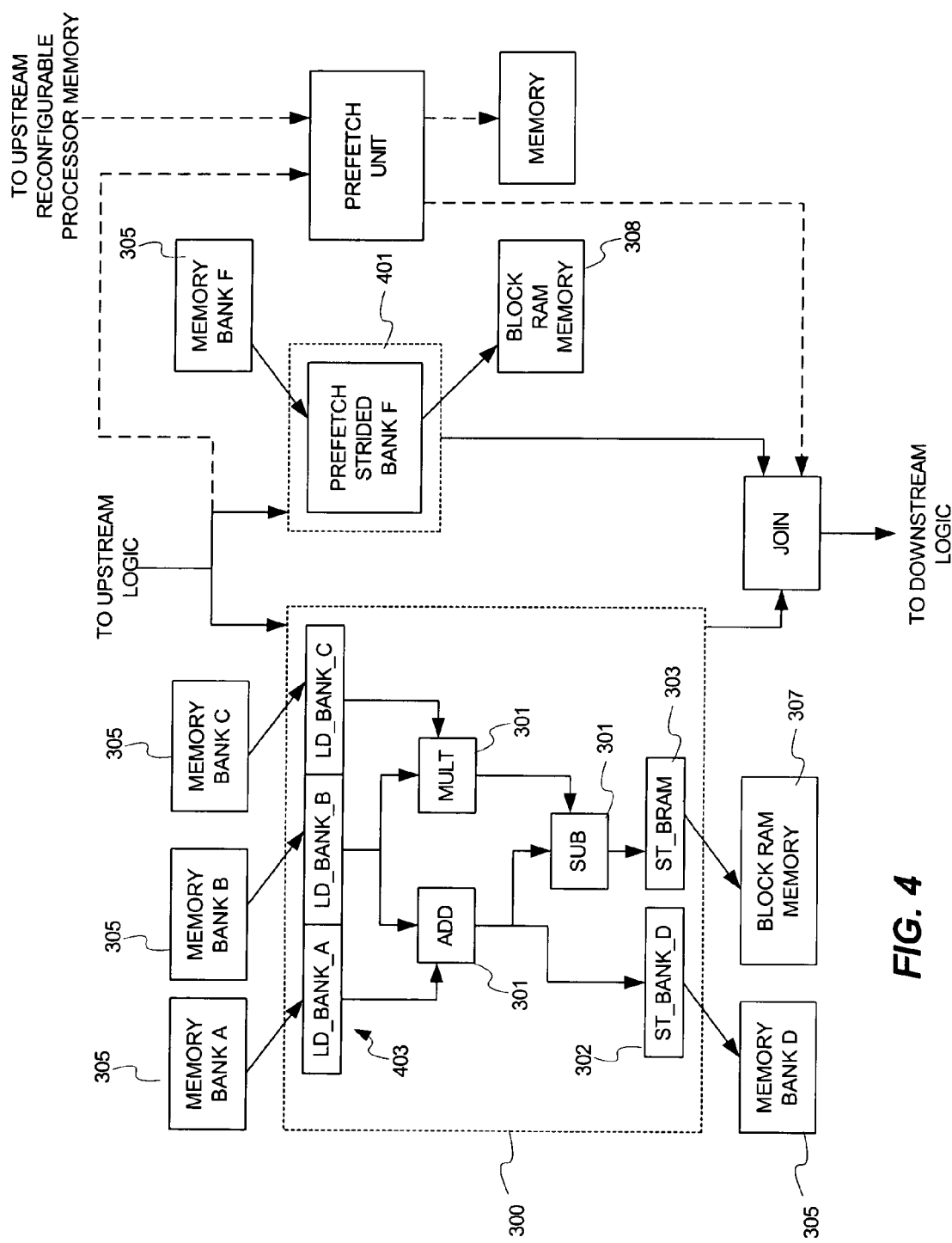
FIG. 4 shows a reconfigurable processor as in FIG. 3, but with the addition of data prefetch units.

FIG. 4 illustrates the logic block 300 with an addition of a data prefetch unit 401. The data prefetch unit 401 moves data from one member of the memory hierarchy 305 to another 308. Data prefetch unit 401 operates independently of other functional units 301, 302 and 303 and can therefore operate prior to, in parallel with, or after computational logic. This independence of operation permits hiding the latency associated with obtaining data for use in computation. The data prefetch unit deposits data into the memory hierarchy within RP 100, where computational logic 301, 302 and 303 can access it through data access units. In the example of FIG. 4, prefetch unit 401 is configured to deposit data into block RAM memory 308. Hence, the prefetch units 401 may be operated independently of logic block 300 that uses prefetched data.

Figure 9A:
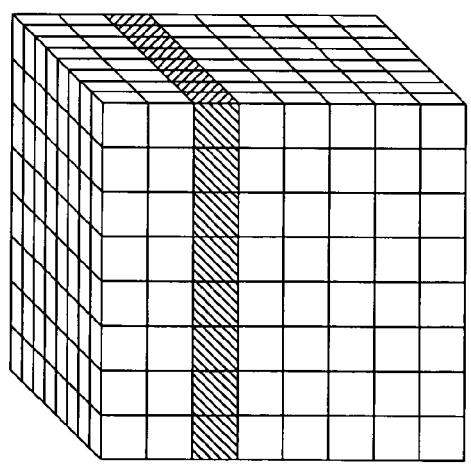
FIG. 9A and FIG. 9B show the bandwidth efficiency and utilization gains obtained when utilizing a data prefetch unit and an intelligent memory controller to perform subset memory references in X-Y plane.
Figure 9B:
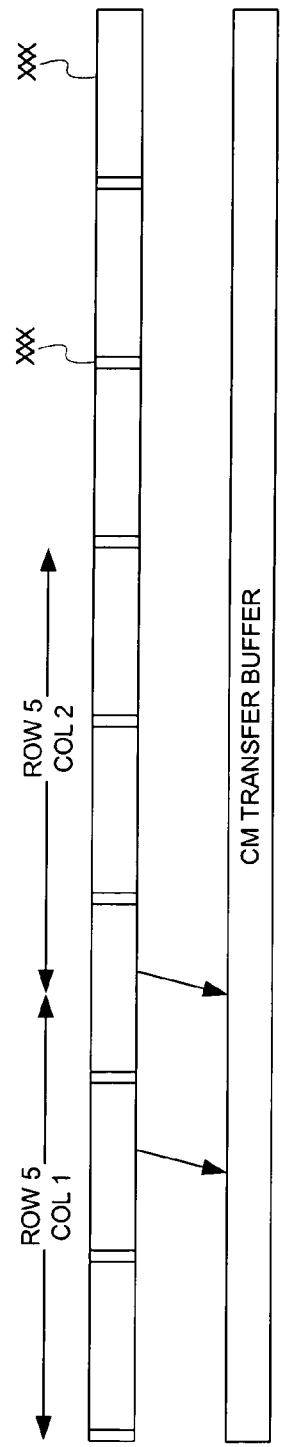

An important feature of the present invention is that many types of data prefetch units can be defined so that the prefetch hardware can be configured to conform to the needs of the algorithms currently implemented by the computational logic. The specific characteristics of the prefetch can be matched with the needs of the computational logic and the format and location of data in the memory hierarchy. For example, FIG. 9A and FIG. 9B show an external memory that is organized in a 128 byte (16 word) block structure. This organization is optimized for stride 1 access of cache based computers. A stride 128 access can result in a very inefficient use of bandwidth from the memory, since an extra 120 bytes of data is moved for every 8 bytes of requested data yielding a 6.25% bandwidth efficiency.

Figure 5:
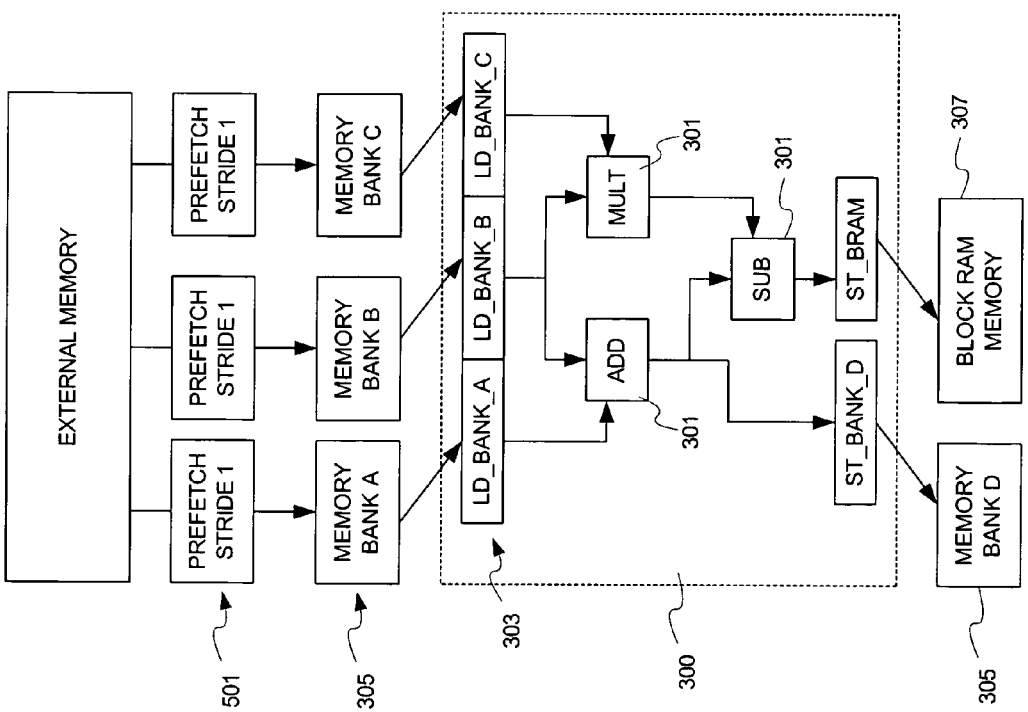
FIG. 5 shows reconfigurable processor with the inclusion of external memory.

FIG. 5 shows an example of data prefetch in which there are no bandwidth gains since all data fetched from external memory blocks is also transferred and used in computational units 301 through memory bank access units 303. However, bandwidth utilization is increased due to the ability of the data prefetch units 501 to initiate a data transfer in advance of the requirement for data by computational logic.

Figure 6:
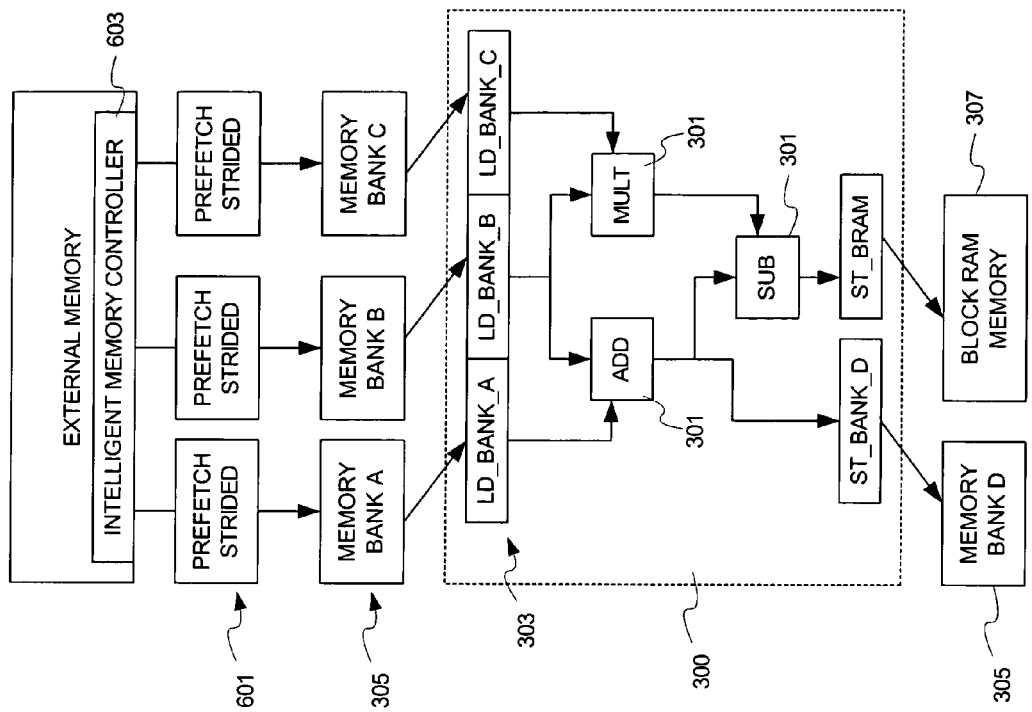
FIG. 6 shows reconfigurable processors with external memory and with an intelligent memory controller.

In accordance with an embodiment of the present invention, data prefetch units 601 are configured to communicate with an intelligent memory controller 603 in FIG. 6 and can extract only the desired 8 bytes of data, discard the remainder of the memory block, and transmit to the data prefetch unit only the requested portion of the stride 128 data. The prefetch units 601 then delivers that data to the appropriate memory components within the memory hierarchy of the logic block 300.

FIG. 6 shows the prefetch units 601 delivering data to the RP's onboard memory banks 305. An onboard memory bank data access unit 303 then delivers the data to computational logic 301 when required. The data prefetch units 501 couple with an intelligent memory controller 601 in the implementation of FIG. 6 that supports a strided reference pattern, which yields a 100% bandwidth efficiency in contrast to the 6.25% efficiency. Although illustrated as a single block of external memory, multiple numbers of external memories may be employed as well.

Figure 7:
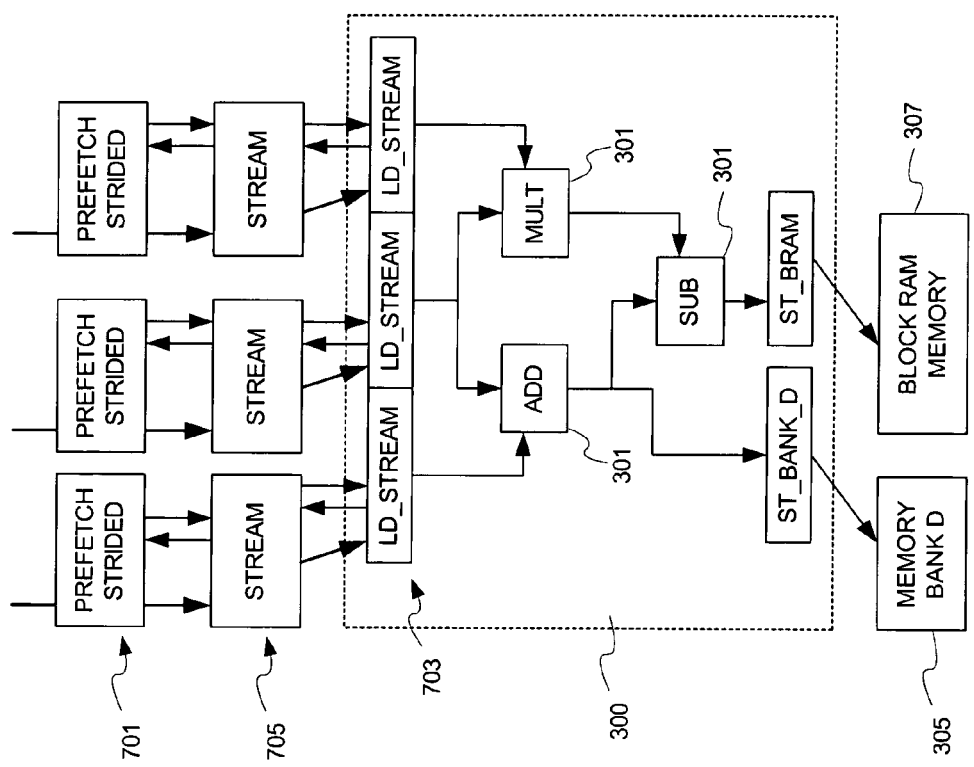
FIG. 7 shows a reconfigurable processor having a combination of data prefetch units and data access units feeding computational logic.

In FIG. 7, the combination of data prefetch units 701 and data access units 703 feeding computational logic 301 such that bandwidth efficiency and utilization are maximized is shown in FIG. 7. In this example strided data prefetch units 701 fetch only the required data words from external memory. FIG. 8 demonstrates the efficiency gains enabled by this combination. Prefetch units 701 deliver the data into stream memory components 705 that is accessed by stream data access units 703. The stream data access units 703 fetch data from the stream based on valid data bits that are provided to the stream by the data prefetch units 701 as data is presented to the stream. Use of the stream data access unit allows computational logic to be activated upon initiation of the data prefetch operation. This, in turn, allows computation to start with the arrival of the first data item, signaled by valid data bits. Computational logic 301 does not have to await arrival of a complete buffer of data in order to proceed. This elimination of latency increases the bandwidth utilization, by allowing data transfer to continue uninterrupted and in parallel with computation.

FIG. 8 illustrates the efficiency gains enabled by the configuration of FIG. 7. FIG. 8 shows a plurality of memory blocks 800 in which only one memory element 801 exists in each memory block 800. The configuration of FIG. 7 allows the desired portions 801 of each memory block 800 to be compacted into a transfer buffer 805. The desired data elements 801 are compacted in order. Since only the contents of the transfer buffer 805 need be transferred to the computational logic, a significant increase in transfer efficiency can be realized.

FIGS. 9A/9B, 10A/10B, 11A/11B and 12A/12B show bandwidth efficiency gains that are achieved in various situations when a subset of stored data is required for computation. Applications store data in a specific order in memory. However it is often the case that the actual reference pattern required during computation is different from the ordering of data in memory. FIGS. 9A/9B, 10A/10B, 11A/11B and 12A/12B show an example of a X,Y,Z coordinate oriented data which is stored such that striding though the X axis is the most efficient for retrieving blocked data.

Coupling data prefetch units in the RP 100 with an intelligent memory controller 601 in the external memory yields a significant improvement in bandwidth efficiency and utilization. Four examples are presented in the FIGS. 9A/9B, 10A/10B, 11A/11B and 12A/12B in which the shaded memory locations indicate desired data. The Figures illustrate an intelligent memory controller's response to each of four different data prefetch unit's requests for data. Again, an important feature of the present invention is the ability to implement various kinds or styles of prefetch units to meet the needs of a particular algorithm being implemented by computational elements 301. For ease of illustration, each example shows the same set of computational logic, however, in most cases the function being implemented by components 301 would change and therefore alter the decision as to which prefetch strategy is most appropriate. In accordance with the present invention, the prefetch units are implemented in a manner that is optimized for the implemented computational logic.

Figure 10A:
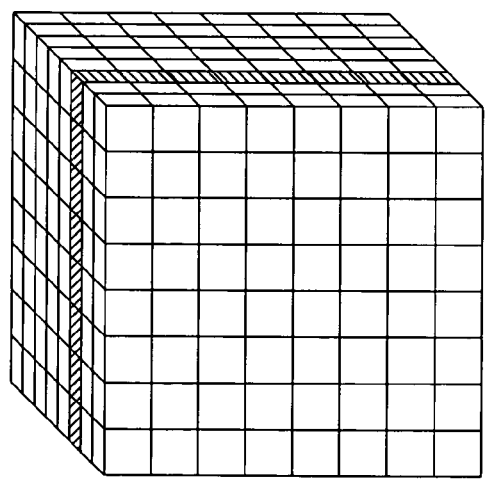
FIG. 10A and FIG. 10B show the bandwidth efficiency and utilization gains obtained when utilizing a data prefetch unit and an intelligent memory controller to perform subset memory references in X-Z plane.
Figure 10B:
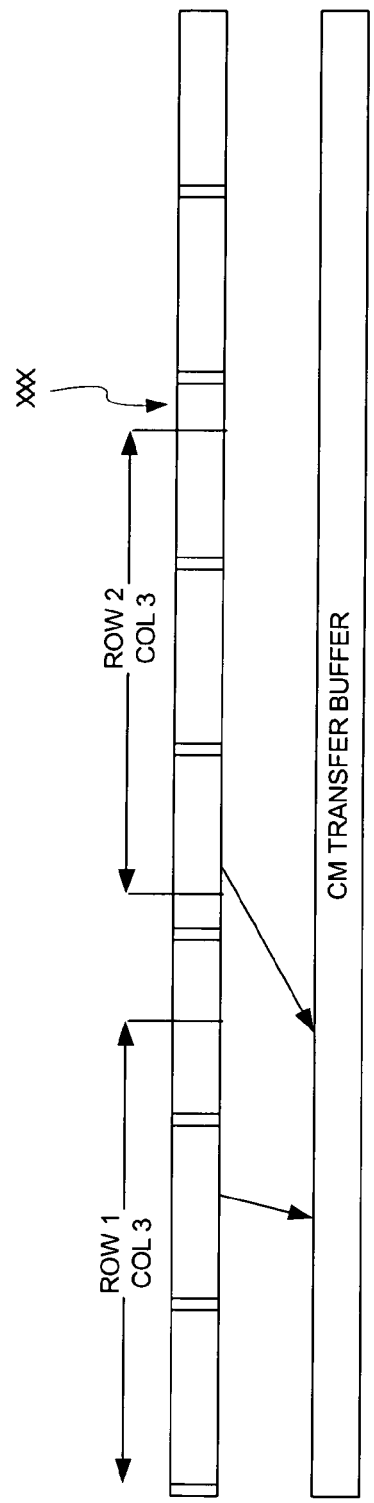
Figure 11A:
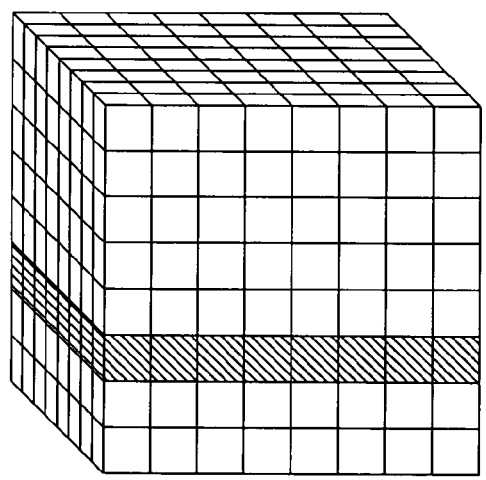
FIG. 11A and FIG. 11B show the bandwidth efficiency and utilization gains obtained when utilizing a data prefetch unit and an intelligent memory controller to perform subset memory references in Y-Z plane.
Figure 11B:
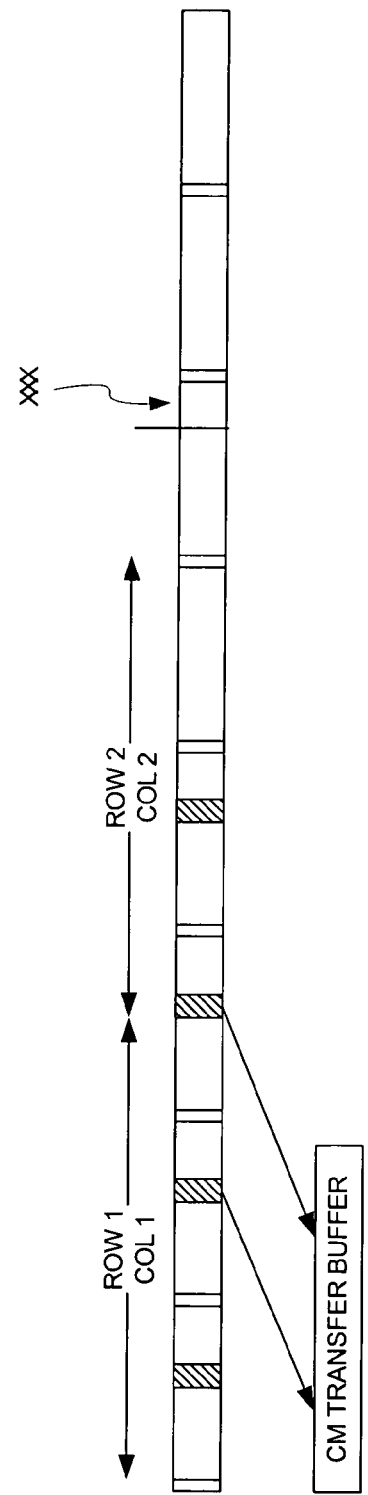
Figure 12A:
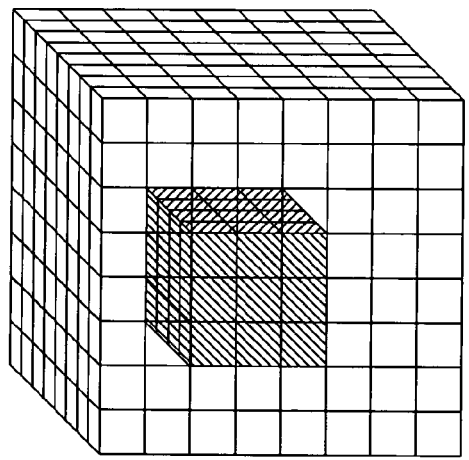
FIG. 12A and FIG. 12B show the bandwidth efficiency and utilization gains obtained when utilizing a data prefetch unit and an intelligent memory controller to perform subset memory references in a mini-cube.
Figure 12B:
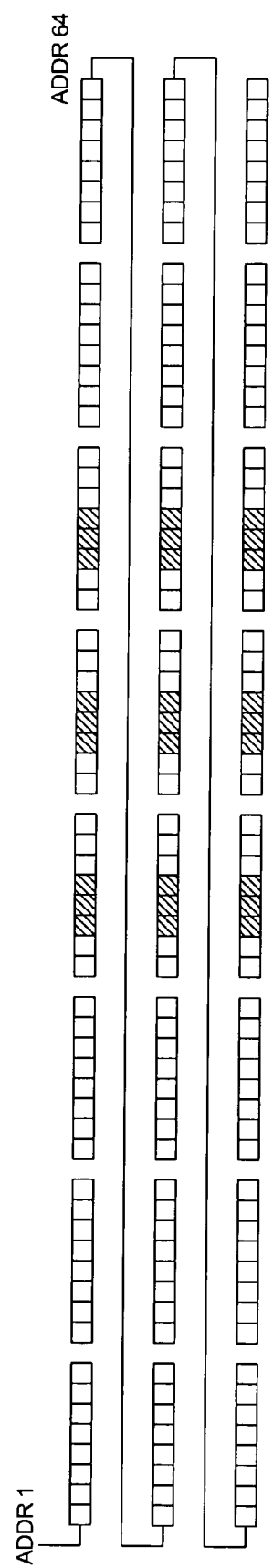

FIGS. 9A/9B shows response to a request from an XY-slice data prefetch unit. FIGS. 10A/10B shows response to a XZ-slice data prefetch unit request. FIGS. 11A/11B shows response to a YZ-slice data prefetch unit request. FIGS. 12A/12D shows the response to a SubCube data prefetch unit request. In each of these examples the data prefetch units are configured to pass information to the intelligent memory controller 601 to identify the type of request that is being made, as well as a data address and parameters, in this case, defining the slice size or sub-cube size.

Figure 13:
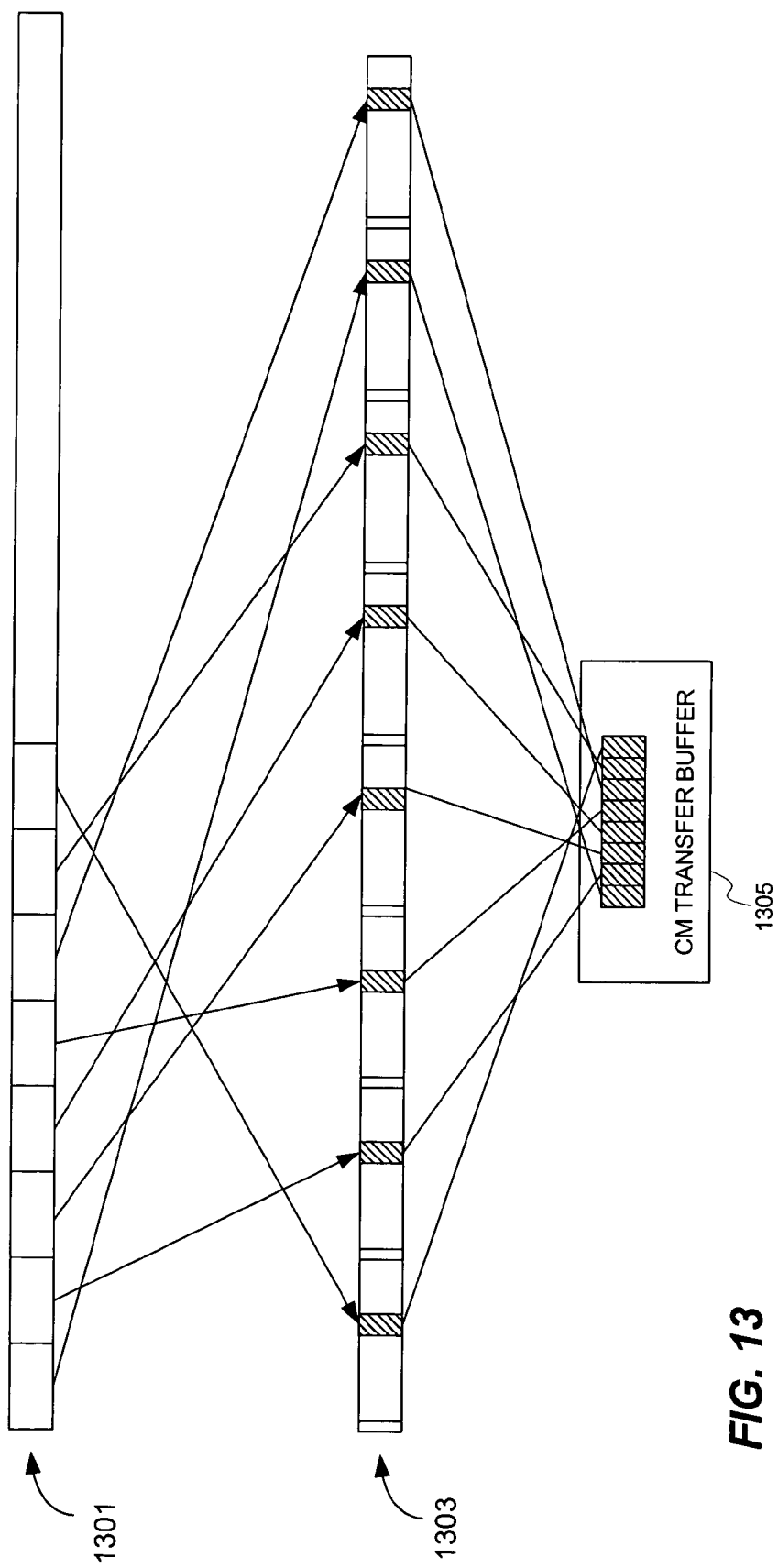
FIG. 13 shows the bandwidth efficiency and utilization gains obtained when utilizing a data prefetch unit and an intelligent memory controller to perform indirect memory references.

One of the largest bandwidth efficiency and utilization gains can be seen in the case of a Gather data prefetch unit working in cooperation with an intelligent memory controller 601. FIG. 13 illustrates the activity in the external memory controller 601. In this example an index array 1301 and a data array 1303 reside in memory. A gather data prefetch unit in an RP 100 requests a gather by specifying the access type as "gather", and providing a pointer to index array 1301, and another pointer to the data array 1303. The memory controller uses the index array 1301 to select desired data elements, indicated by shading, and then delivers an in order stream of data to the prefetch unit. Gains are made by delivering only requested data from transfer buffer 1305 (not the remainder of a data block as in cache line oriented systems) by eliminating the need to transfer an index array either to the processor or to the memory controller, and by eliminating the start/stop time required when the data is not streamed to the requestor.

Figure 14:
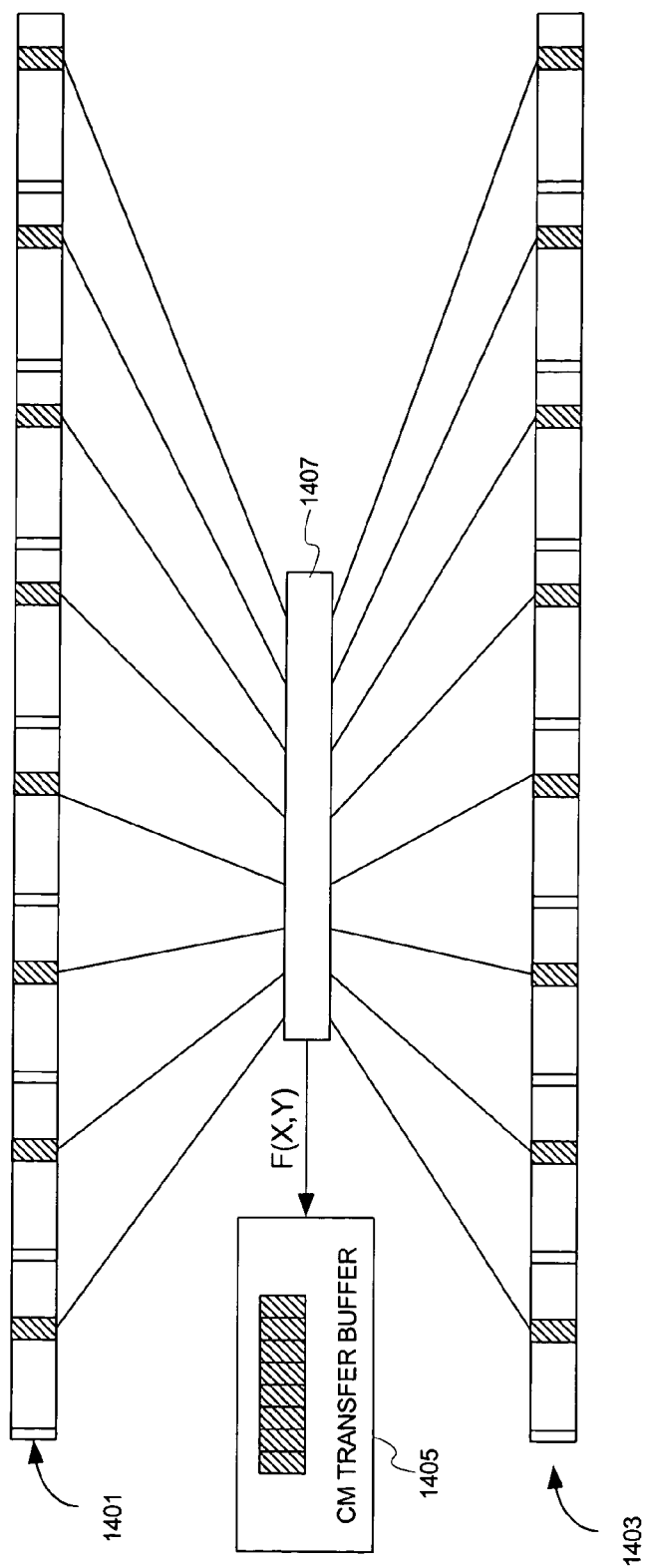
FIG. 14 shows the bandwidth efficiency and utilization gains obtained when utilizing a data prefetch unit and an intelligent memory controller to perform strided memory reference together with computation.

A further bandwidth efficiency and utilization gain is made when coupling a data prefetch unit with memory controller capable of computation. FIG. 14 illustrates activity in a cooperating memory controller having a computational component 1407 in response to a data prefetch unit. Here the prefetch units requests a "strided compute", providing parameters for an operator, and addresses, and strides for data to be operated upon. In FIG. 14, the data to be operated on comprises "X" data 1401 and "Y" data 1403. The data 1401 and 1403 are processed by computational component 1407 to generate a resultant value that is a specified function of X and Y as indicated by F(X,Y) in FIG. 14. The resultant values are then passed to the requesting prefetch unit via transfer buffer 1405. In this case only computed results are passed and no operand data need to transferred. Accordingly, where the desired data, indicated by shading in FIG. 14, resides across multiple blocks, efficiency is achieved not only by avoiding transfer of the undesired data surrounding the desired data, but also because only the result is transferred, not the original data 1401/1403.

EXAMPLES

Some programming examples utilizing the memory hierarchy of the present invention will now be illustrated. The first example illustrates how a computational intensive matrix multiplication problem may be handled by the explicitly parallel and addressable storage of the present invention.

Example 1

Explicit Parallel and Addressable Storage

Consider the matrix multiplication C=A×B, where:
A is a matrix of size M rows by 64 columns;
B is a matrix of size 64 rows by N columns; and
C is a matrix of size M rows by N columns.

The size and shape of this problem typically arises in the context of LU decomposition in linear algebra libraries (e.g., LAPACK). The operation count for this problem would be 2*M*N*64, and the total data necessary to transport would be (M*64+N*64+M*N), making the problem quite computationally intensive.

The dot-product formulation of the matrix multiplication may be represented as the following a triple-nested loop:

```
for (i = 0; I<m; I++) {
    for (j = 0; j< n; j++) {
        sum = 0;
    for (k = 0; k < 64; k++) {
        sum += A[k*m*l] * B[j*64+k];
    }
    C1[i+j+mm] = sum;
    }
}
```

On a conventional microprocessor with static execution resources, these loops would be arranged to give stride-one data access where possible and also block or tile these uses to facilitate data cache hits on the B and A matrices, which are read many times. With the configurable memory hierarchy of the present invention, matrix B may be stored in on-board BRAM memory 307 and rows of matrix A in registers.

The rows of matrix B may be stored in independently, locally declared BRAM arrays (B0, B1, . . . B63). The rows are stored as independent memory structures, and may be accessed in parallel. Rows of matrix A may be stored in 64 registers described with scalar variables. With these explicit data structures, the following pseudo code can describe the matrix multiplication:

Load B into BRAM;
for (i=0; i<m; i++) {
Load ith Row of A into registers A00 to A63;
For (j=0; j<n; j++) {
C[i+j+m]+=
A00\*b0[j]+
A01\*b1[j]+
A02\*b2[j]+//inner loop produces
A03\*b3[j]+//128 results per
A04\*b4[j]+//clock cycle. 64 rows
A05\*b5[j]+//of B are read in
A06\*b6[j]+//parallel
. . .
A63\*b63[j];

The code is designed to minimize the amount of data motion. The A and B matrices are read once and the C matrix is written just once at it is produced. When computational resources permit, the i loop could also be unrolled to process multiple rows of matrix A against matrix B in the inner loop.

Processing two rows of A, for example, would produce 256 computational results per clock cycle.

Example 2

Irregular Memory Access

Benchmarks have been developed for measuring the ability of a computer system to perform indirect updates. An indirect update, written in the C programming language, looks like:

```
for (I = 0; I < N; I++) {
    A[Index[I]]) = A[Index[I]] + B[I];
}
```

Typically, A is a large array, and Index has an unpredictable distribution. The benchmark generally forces memory references to miss in cache, and for entire cache lines to be brought in for single-word updates. The problem gets worse as memories get further away from processors and cache lines become wider.

In this example, the arrays have 64-bit data. To complete one iteration of this loop, 24 bytes of information is required from memory and 8 bytes are written back for a total of 32 bytes of memory motion per iteration. On an implicit architecture with cache-lines of width W bytes, each iteration results in the following memory bus traffic:
 1. Index[I]: 8 bytes per iteration due to stride-1 nature;
 2. B[I]: 8 bytes per iteration due to stride-1 nature; and
 3. A[Index[I]]: W bytes read and written per iteration.

The total amount of bus traffic is 2*W+16 bytes per iteration. On an average microprocessor today, W=128 so an iteration of this loop results in 272 bytes of memory traffic when only 32 bytes is algorithmically required, making only 12% of the data moved as being useful for the problem.

In addition, because microprocessors rely on wide cache lines and hardware pre-fetching strategies to amortize the long latency to main memory, only a small number of outstanding cache-line misses are typically tolerated. Because of the irregular nature of this example, hardware pre-fetching provides little benefit, making it difficult to keep the memory bus saturated, even with the large amount of wasted memory traffic. Bus utilization on the microprocessor processing only consumes about 700 MB/sec of the 3.2 GB/sec available, or 22%. Combining the poor bus utilization with the relatively small amount of data that is useful results in the microprocessor executing at about 2.5% of peak.

The memory hierarchy of the present invention does not require that memory traffic be organized in a cache-line structure, permitting loop iteration to be accomplished with the minimum number of bytes (in this case 32 bytes of memory traffic). In addition, data pre-fetch functional units may be fully pipelined, allowing full use of available memory bus bandwidth. Data storing may be handled in a similar pipelined fashion. An example of the pseudo code that performs the random update in the memory hierarchy looks like:

```
for (i=0; I < N-Gather_size; I=I+Gather_size) {
    gather ( A, Index, I, A_local, Gather_size)
```

-continued

```
    for (j=); j < Gather_size; j++) {
        A_local[j] = A_local[j] + B[j];
    }
    scatter (A_local, Index, &A[I], Gather_size);
}
```

This loop will pipeline safely as described by the pseudo code provided that the index vector has no repeated values within each Gather_size segment. If repeats are present, then logic within the gather unit can preprocess the Index vector and B vector into safe sub-lists that can be safely pipelined with little or no overhead.

CONCLUSION

It should be apparent that the scaleable, programmable memory mechanisms enabled by the present invention are available to the exploit available algorithm locality and thereby achieve up to 100% bandwidth efficiency. In addition, the scaleable computational resources can be leveraged to attain 100% bandwidth utilization. As a result, the present invention provides a programmable computational system that delivers the maximum possible performance for any memory bus speed. This combination of efficiency and utilization yields orders of magnitude performance benefit compared with implicit models when using an equivalent memory bus.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A reconfigurable processor that instantiates an algorithm as hardware comprising:
    a first memory having a first characteristic memory bandwidth and/or memory utilization; and
    a data prefetch unit coupled to the memory, wherein the data prefetch unit retrieves only computational data required by the algorithm from a second memory of second characteristic memory bandwidth and/or memory utilization and places the retrieved computational data in the first memory wherein the data prefetch unit operates independent of and in parallel with logic blocks using the computational data, and wherein at least the first memory and data prefetch unit are configured to conform to needs of the algorithm, and the data prefetch unit is configured to match format and location of data in the second memory.

2. The reconfigurable processor of claim 1, wherein the data prefetch unit is coupled to a memory controller that controls the transfer of the data between the memory and the data prefetch unit and transmits only portions of data desired by the data prefetch unit and discards other portions of data prior to transmission of the data to the data prefetch unit.

3. The reconfigurable processor of claim 1, wherein the data prefetch unit receives processed data from on-processor memory and writes the processed data to an external off-processor memory.

4. The reconfigurable processor of claim 1, wherein the data prefetch unit comprises at least one register from the reconfigurable processor.

5. The reconfigurable processor of claim 1, wherein the data prefetch unit is disassembled when another program is executed on the reconfigurable processor.

6. The reconfigurable processor of claim 1 wherein said second memory comprises a processor memory and said data prefetch unit is operative to retrieve data from a processor memory.

7. The reconfigurable processor of claim 6 wherein said processor memory is a microprocessor memory.

8. The reconfigurable processor of claim 6 wherein said processor memory is a reconfigurable processor memory.

9. A reconfigurable hardware system, comprising:
   a common memory; and
   one or more reconfigurable processors that can instantiate an algorithm as hardware coupled to the common memory, wherein at least one of the reconfigurable processors includes a data prefetch unit to read and write only data required for computations by the algorithm between the data prefetch unit and the common memory wherein the data prefetch unit operates independent of and in parallel with logic blocks using the computational data, and wherein the data prefetch unit is configured to conform to needs of the algorithm and match format and location of data in the common memory.

10. The reconfigurable hardware system of claim 9, comprising a memory controller coupled to the common memory and the data prefetch unit that transmits to the prefetch unit only data desired by the data prefetch unit as required by the algorithm.

11. The reconfigurable hardware system of claim 9, wherein the at least of the reconfigurable processors also includes a computational unit coupled to the data access unit.

12. The reconfigurable hardware system of claim 11, wherein the computational unit is supplied the data by the data access unit.

13. A method of transferring data comprising:
   transferring data between a memory and a data prefetch unit in a reconfigurable processor; and
   transferring the data between a computational unit and the data access unit, wherein the computational unit and the data access unit, and the data prefetch unit are configured to conform to needs of an algorithm implemented on the computational unit and transfer only data necessary for computations by the computational unit, and wherein the prefetch unit operates independent of and in parallel with the computational unit.

14. The method of claim 13, wherein the data is written to the memory, said method comprising:
   transferring the data from the computational unit to the data access unit; and
   writing the data to the memory from the data prefetch unit.

15. The method of claim 13, wherein the data is read from the memory, said method comprising:
   transferring only the data desired by the data prefetch unit as required by the computational unit from the memory to the data prefetch unit; and
   reading the data directly from the data prefetch unit to the computational unit through a data access unit.

16. The method of claim 15, wherein all the data transferred from the memory to the data prefetch unit is processed by the computational unit.

17. The method of claim 15, wherein the data is selected by the data prefetch unit based on an explicit request from the computational unit.

18. The method of claim 13, wherein the data transferred between the memory and the data prefetch unit is not a complete cache line.

19. The method of claim 13, wherein a memory controller coupled to the memory and the data prefetch unit, controls the transfer of the data between the memory and the data prefetch unit.

* * * * *

UNITED STATES PATENT AND TRADEMARK OFFICE
CERTIFICATE OF CORRECTION

PATENT NO.        : 7,149,867 B2                                           Page 1 of 1
APPLICATION NO. : 10/869200
DATED             : December 12, 2006
INVENTOR(S)       : Daniel Poznanovic, David E. Caliga and Jeffrey Hammes It is certified that error appears in the above-identified patent and that said Letters Patent is hereby corrected as shown below:

Column 12, line 43, insert --first-- after "coupled to the"

Column 12, line 57, insert --second-- after "between the"

Column 13, line 6, "a" should be --the--

Column 14, line 4, the second occurrence of "the" should be --a--.

Signed and Sealed this

Twenty-fourth Day of April, 2007

JON W. DUDAS
*Director of the United States Patent and Trademark Office*